United States Patent
Kitahashi et al.

(10) Patent No.: US 11,611,682 B2
(45) Date of Patent: Mar. 21, 2023

(54) COMMUNICATION SYSTEM, NON-TRANSITORY COMPUTER-READABLE STORAGE MEDIUM STORING COMPUTER-READABLE INSTRUCTIONS FOR TERMINAL, SERVER SYSTEM, AND NON-TRANSITORY COMPUTER-READABLE STORAGE MEDIUM STORING COMPUTER-READABLE INSTRUCTIONS FOR SERVER

(71) Applicant: BROTHER KOGYO KABUSHIKI KAISHA, Nagoya (JP)

(72) Inventors: Yuki Kitahashi, Nagoya (JP); Yutaka Takijiri, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 17/679,313

(22) Filed: Feb. 24, 2022

(65) Prior Publication Data
US 2022/0279090 A1  Sep. 1, 2022

(30) Foreign Application Priority Data
Feb. 26, 2021 (JP) .............................. JP2021-030152

(51) Int. Cl.
*H04N 1/44* (2006.01)
*H04L 9/40* (2022.01)

(52) U.S. Cl.
CPC ......... *H04N 1/4413* (2013.01); *H04L 63/083* (2013.01); *H04N 1/4433* (2013.01)

(58) Field of Classification Search
CPC ... H04N 1/4413; H04N 1/4433; H04L 63/083
See application file for complete search history.

(56) References Cited

U.S. PATENT DOCUMENTS 8,719,952 B1 * 5/2014 Damm-Goossens ....................... H04L 9/3226 726/28
2010/0218241 A1 * 8/2010 Faryna .................... G06F 21/43 726/5

(Continued)

FOREIGN PATENT DOCUMENTS

JP      2014-178984 A      9/2014

*Primary Examiner* — Juan M Guillermety
(74) *Attorney, Agent, or Firm* — Scully, Scott, Murphy & Presser, PC

(57) ABSTRACT

A processor of a server is configured to receiving a first registration request from a terminal, storing first account and first authentication data in a memory of the server in association with each other, transmitting the first authentication data to terminal, receiving a third registration request from a communication device, storing device identification data and second authentication data in the memory in association with each other, transmitting the second authentication data to the communication device, receiving a fourth registration request including the first authentication data and the second authentication data, and storing the first account data associated with the first authentication data included in the fourth registration request and the device identification data associated with the second authentication data included in the fourth registration request in the memory in association with each other.

14 Claims, 8 Drawing Sheets

(56) References Cited

U.S. PATENT DOCUMENTS

2014/0282996 A1* 9/2014 Mori ............... H04N 1/4433
  726/10
2019/0050170 A1* 2/2019 Ren ................. G06F 3/1222

* cited by examiner

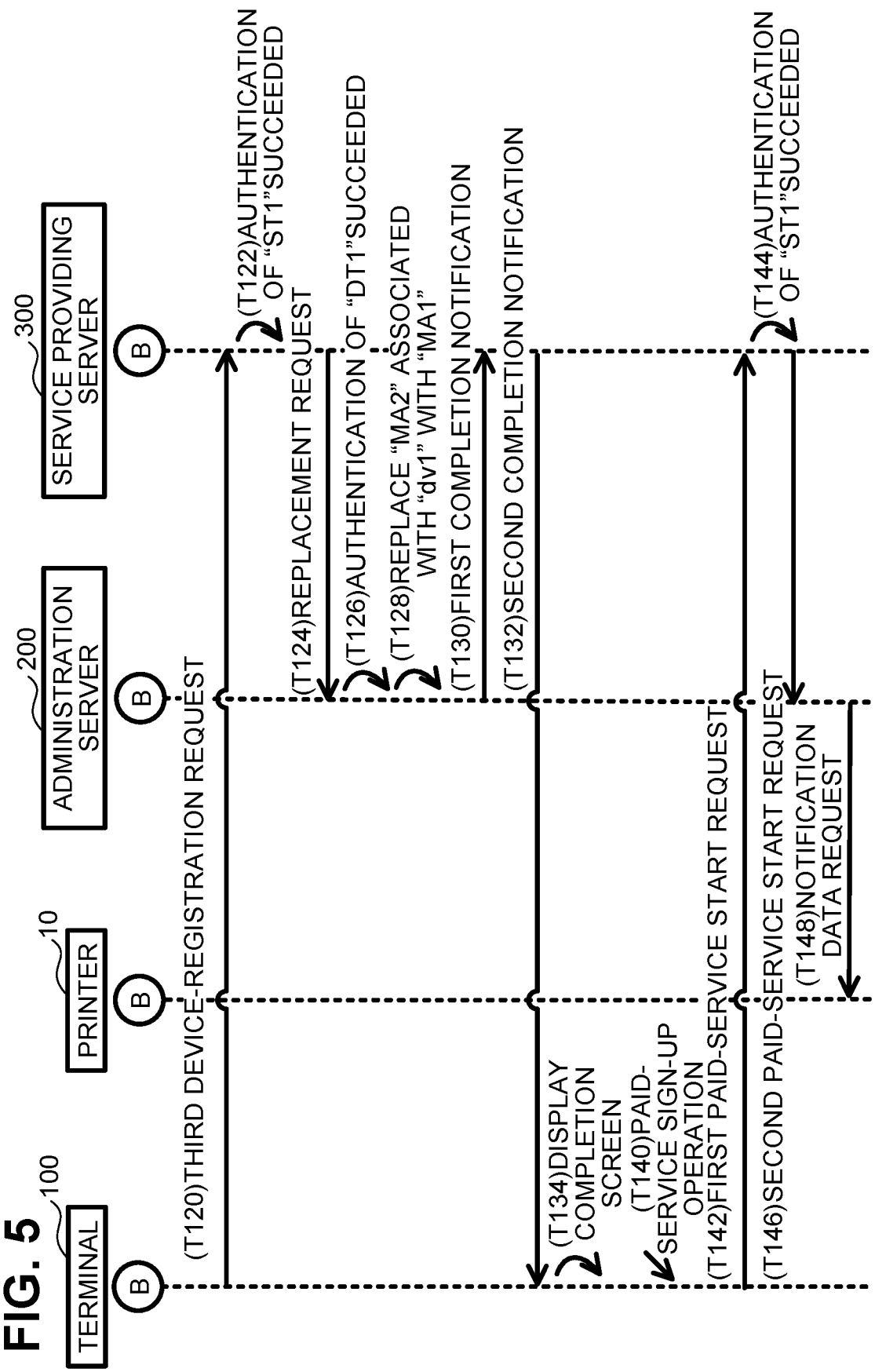

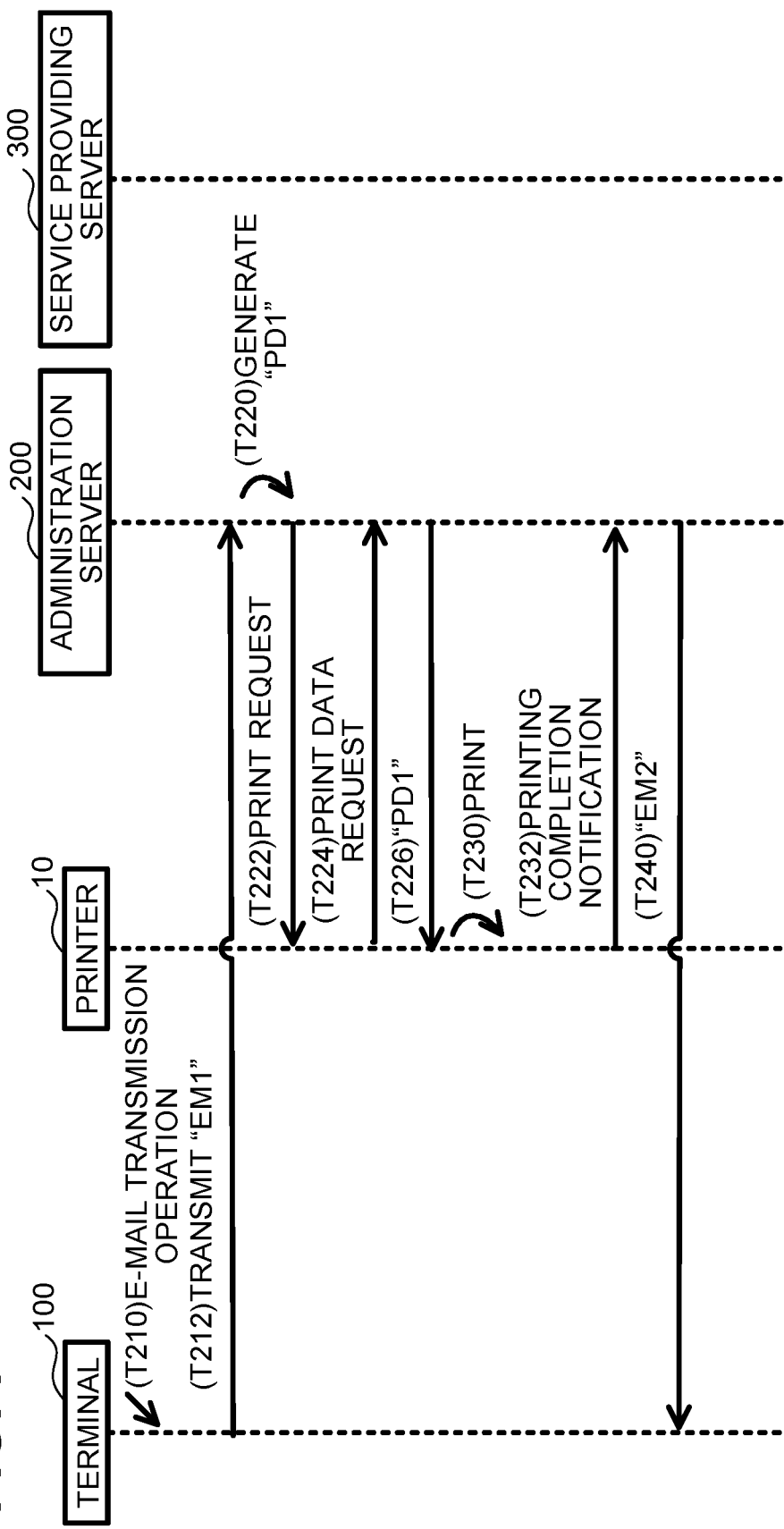

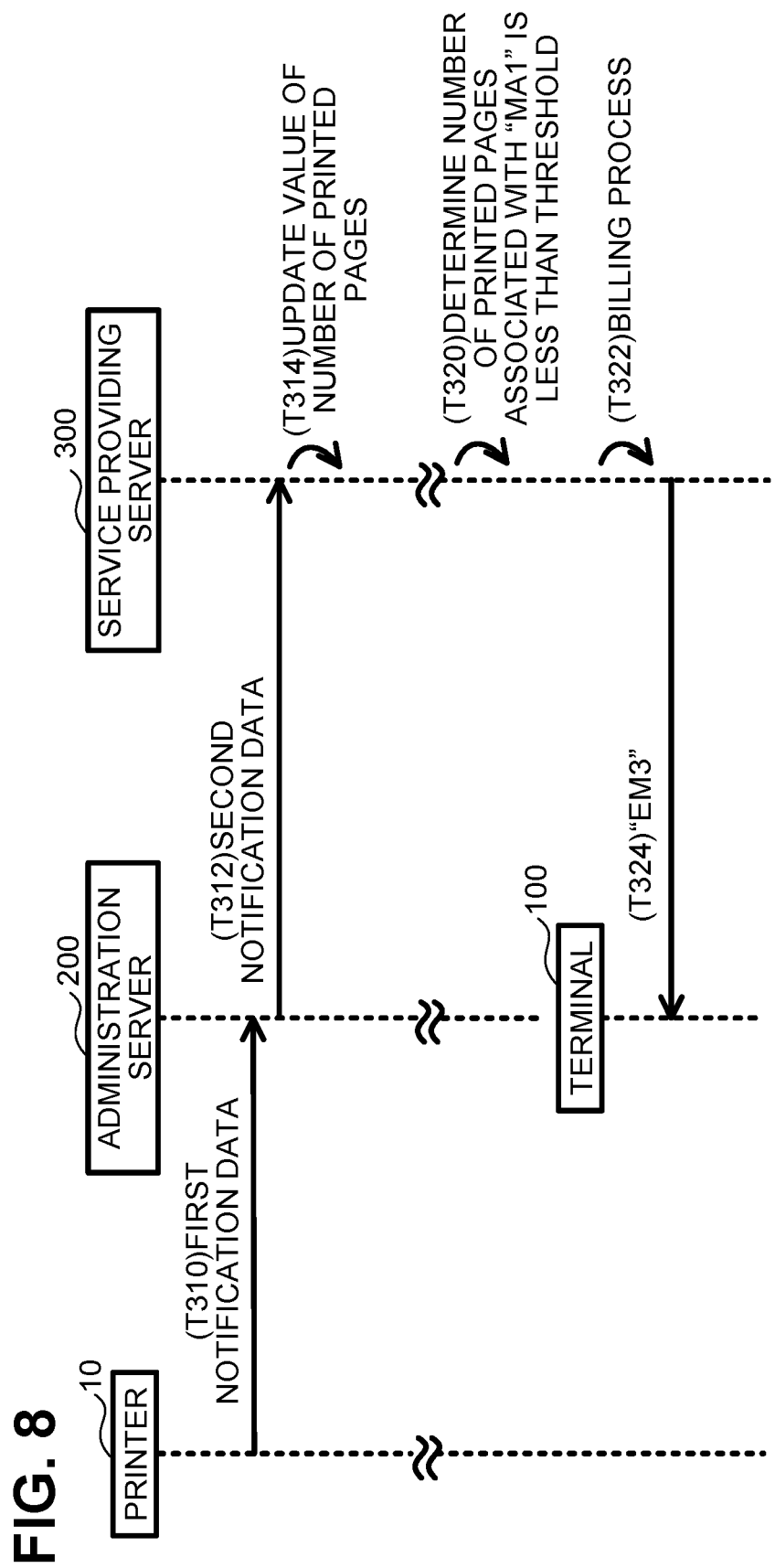

COMMUNICATION SYSTEM, NON-TRANSITORY COMPUTER-READABLE STORAGE MEDIUM STORING COMPUTER-READABLE INSTRUCTIONS FOR TERMINAL, SERVER SYSTEM, AND NON-TRANSITORY COMPUTER-READABLE STORAGE MEDIUM STORING COMPUTER-READABLE INSTRUCTIONS FOR SERVER

CROSS-REFERENCE TO RELATED APPLICATION

This application claims priority from Japanese Patent Application No. 2021-030152 filed on Feb. 26, 2021, the content of which is incorporated herein by reference in its entirety.

TECHNICAL FIELD

Aspects of the disclosure relate to a technique for storing account data and device identification data for identifying a communication device in a server in association with each other.

BACKGROUND

A known a network system includes a server, a data processing device, and an information device. In response to receiving a request to generate an account from the data processing device, the server generates and transmits an account and a PIN code to the data processing device. In response to accepting input of the PIN code, the information device transmits connection request data including a device ID to the server. In response to receiving the connection request data from the information device, the server stores the account and the device ID in association with each other.

SUMMARY

Aspects of the disclosure provide a technique for storing account data and device identification data for identifying a communication device in a server in association with each other.

According to one or more aspects of the disclosure, a communication system may include a terminal including a processor and memory, a communication device including a processor and memory, and a server including a processor and memory. The processor of the terminal device may be configured to transmit a first registration request to the server. The first registration request may request registration of account data. The processor of the server may be configured to, in response to receiving the first registration request, store first account data and first authentication data in the memory of the server in association with each other, and transmit the first authentication data to the terminal. The processor of the terminal may be configured to receive the first authentication data transmitted from the server, and transmit a second registration request to the communication device. The second registration request may request registration of the communication device with the server. The processor of the communication device may be further configured to, in response to receiving the second registration request from the terminal, transmit a third registration request to the server. The third registration request may request registration of the communication device with the server. The processor of the server may be further configured to, in response to receiving the third registration request from the communication device, store device identification data and second authentication data in the memory of the server in association with each other, the device identification data identifying the communication device, and transmit the second authentication data to the communication device. The processor of the communication device may be further configured to, in response to receiving the second authentication data from the server, transmit the second authentication data to the terminal. The processor of the terminal may be further configured to, in response to receiving the first authentication data from the server and the second authentication data from the communication device, transmit a fourth registration request to the server. The fourth registration server may include the first authentication data and the second authentication data. The processor of the server may be further configured to, in response to receiving the fourth registration data from the terminal, store the first account data and the device identification data in the memory of the server in association with each other. The first account data may be associated with the first authentication data included in the fourth registration request. The device identification data may be associated with the second authentication data included in the fourth registration request.

According to the one or more aspects of the disclosure, in the server, the first account data and the first authentication data may be stored in association with each other and the device identification data and the second authentication data may be stored in association with each other. The terminal may receive the first authentication data and the second authentication data and transmit, to the server, the fourth registration request including the first authentication data and the second authentication data. Thus, in the server, the first account data associated with the first authentication data and the device identification data associated with the second authentication data are stored in association with each other. Accordingly, the first account data and the device identification data may be stored in the server in association with each other using such a novel method.

According to one or more aspects of the disclosure, a non-transitory computer-readable medium storing computer-readable instructions that, when executed by a processor of a terminal, may cause the processor to perform: transmitting a first registration request to a server, the first registration request requesting registration of account data; receiving first authentication data transmitted from the server, the first authentication data having been stored in the server in association with first account in response to receiving the first registration request from the server; transmitting a second registration request, the second registration request requesting registration of a communication device with the server; receiving second authentication data transmitted from the communication device, the second authentication data having been stored in the server in association with device-identification data identifying the communication device in response to the server receiving a third registration request transmitted from the communication device in response to the communication device receiving the second registration request from the terminal; and in response to receiving the first authentication data and from the server and the second authentication data from the communication device, transmitting a fourth registration request including the first authentication data and the second authentication data.

According to the one or more aspects of the disclosure, the terminal may transmit the first registration request to the server. In this case, the server may store the first account data and the first authentication data in association with each other, and transmit the first authentication data to the terminal. The terminal may receive the first authentication data from the server. The terminal may transmit the second registration request to the communication device. In this case, the communication device may transmit the third registration request to the server. The server may store the device identification data and the second authentication data in association with each other and transmit the second authentication data to the communication device. The terminal may receive the second authentication data from the communication device. Then, the terminal may transmit, to the server, the fourth registration request including the first authentication data and the second authentication data. Thus, in the server, the first account data associated with the first authentication data and the device identification data associated with the second authentication data are stored in association with each other. Accordingly, the first account data and the device identification data may be stored in the server in association with each other using such a novel method.

According to one or more aspects of the disclosure, a server system may include a first server including a first processor and a first memory. The first memory may store computer-readable instructions that, when executed by the first processor, cause the first processor to perform: first reception including receiving a first registration request from a terminal, the first registration request requesting registration of account data; first storing in response to receiving the first registration request from the terminal, the first storing including storing first account and first authentication data in the first memory in association with each other; first transmission including transmitting the first authentication data to the terminal; second reception in response to the terminal transmitting a second registration request to a communication device, the second reception including receiving a third registration request from the communication device, the second registration request requesting registration of the communication device with the first server, the third registration request requesting registration of the communication device with the first server; second storing in response to receiving the third registration request from the communication device, the second storing including storing device identification data and second authentication data in the first memory in association with each other; second transmission including transmitting the second authentication data to the communication device; third reception including receiving a fourth registration request from the terminal, the fourth registration request including the first authentication data and the second authentication data, the second authentication data having been transmitted to the terminal from the communication device in response to the communication device receiving the second authentication data from the first server; and third storing in response to receiving the fourth registration request from the terminal, the third storing including storing the first account and the device identification data in the first memory in association with each other, the first account associated with the first authentication data included in the fourth registration request, the device identification data associated with the second authentication data included in the fourth registration request.

According to the one or more aspects of the disclosure, in response to receiving the first registration request from the terminal, the server may store the first account data and the first authentication data in association with each other. In response to receiving the third registration request from the communication device, the server may store the device identification data and the second authentication data in association with each other. Then, in response to receiving the fourth registration request including the first authentication data and the second authentication data from the terminal, the server may store the first account data associated with the first authentication data and the device identification data associated with the second authentication data in association with each other. Accordingly, the first account data and the device identification data may be stored in the server in association with each other using such a novel method.

Control methods and application programs for implementing the above-described server, and non-transitory computer-readable storage media storing the application programs may have novelty and utility. Control methods and computer programs for implementing the above-described server, and non-transitory computer-readable storage media storing the computer programs may have novelty and utility.

BRIEF DESCRIPTION OF THE DRAWINGS

FIG. 5 is a sequence diagram continued from FIG. 4.

FIG. 7 is a sequence diagram of a mail printing service.

FIG. 8 is a sequence diagram of a paid service.

DETAILED DESCRIPTION

Illustrative Embodiment

Figure 1:
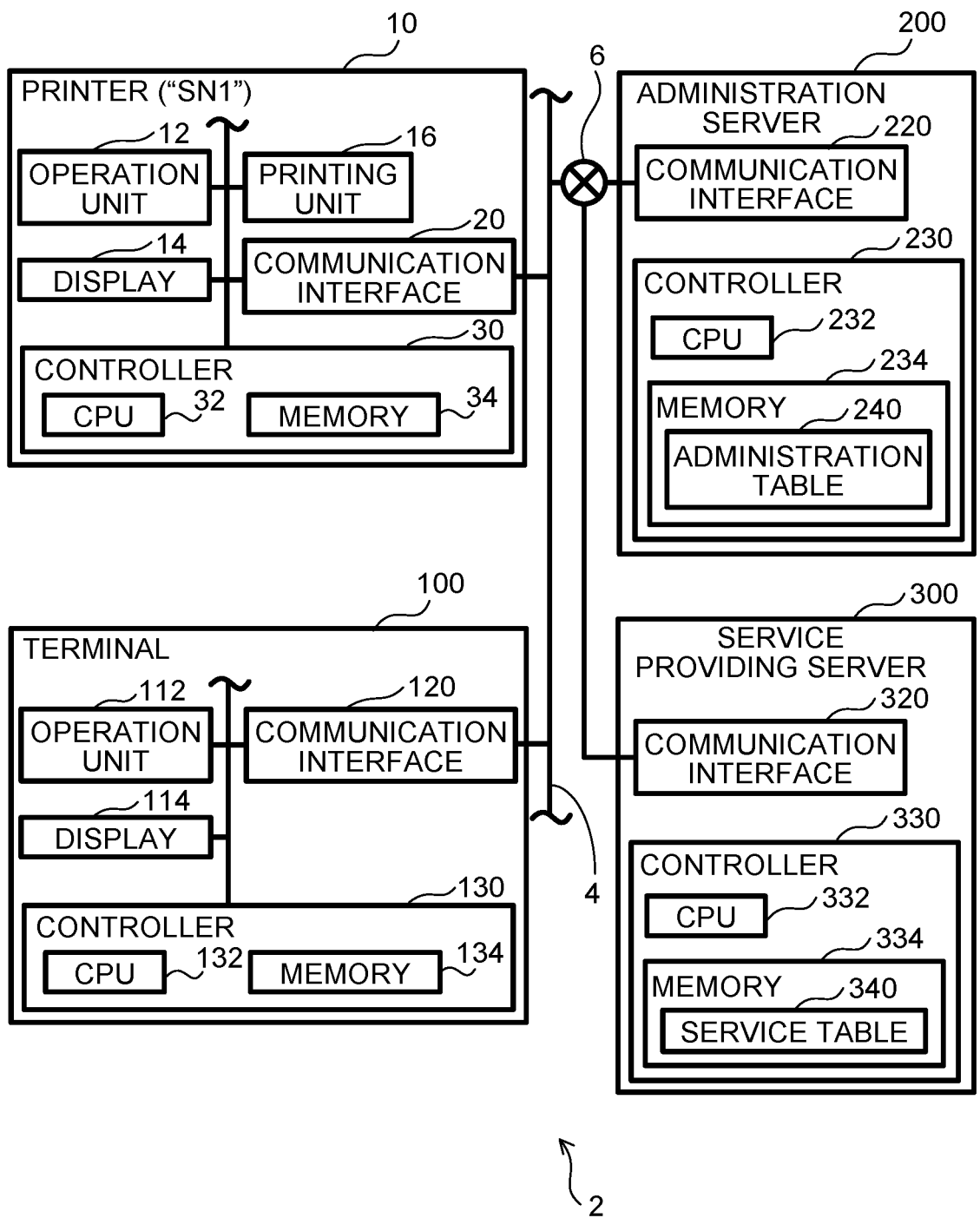
FIG. 1 illustrates a configuration of a communication system.

Configuration of Communication System 2: FIG. 1

As illustrated in FIG. 1, a communication system 2 includes a printer 10, a terminal 100, an administration server 200, and a service providing server 300. The printer 10 and the terminal 100 are connected to a LAN 4. The printer 10 and the terminal 100 are communicable with each other via the LAN 4. The LAN 4 is connected to the Internet 6. The printer 10, the terminal 100, the administration server 200, and the service providing server 300 are connected to the Internet 6. The printer 10, the terminal 100, the administration server 200, and the service providing server 300 are communicable with each other via the Internet 6.

Configuration of Printer 10

The printer 10 may be a peripheral device (e.g., a peripheral device for a general-purpose computer) having a printing function. The printer 10 may be a multifunction device having a scanning function, a facsimile communication function, and other functions in addition to the printing function. The printer 10 further has a mail printing function. The mail printing function enables printing of an image corresponding to an image file attached to an e-mail. The printer 10 includes an operation unit 12, a display 14, a printing unit 16, a communication interface 20, and a controller 30. The printer 10 has a serial number "SN1".

The operation unit 12 includes keys or buttons. The operation unit 12 enables a user to input various instructions to the printer 10. The display 14 is configured to display various information thereon. The display 14 may be a touch screen. The printing unit 16 may be an inkjet or electrophotographic printing mechanism. The communication interface 20 is connected to the LAN 4. The communication interface 20 may be a wireless or wired interface.

The controller 30 includes a CPU 32 and a memory 34. The CPU 32 executes various processing in accordance with a program 36 stored in the memory 34. The memory 34 may be a volatile or nonvolatile memory.

Configurations of Terminal 100

The terminal 100 may be a mobile device such as a cellular phone, a smartphone, a personal digital assistant, a mobile music player, or a mobile video player. The terminal 100 includes an operation unit 112, a display 114, a communication interface 120, and a controller 130.

The operation unit 112 includes buttons and a touch screen that enable the user to operate the terminal 100. The display 114 is configured to display various information thereon. The communication interface 120 is connected to the LAN 4. The controller 130 includes a CPU 132 and a memory 134. The CPU 132 executes various processing in accordance with an OS program 140, a printer application 142, and a browser application 144 that are stored in the memory 134. The memory 134 may be a volatile or nonvolatile memory.

The OS program 140 realizes basic operations of the terminal 100. The printer application 142 enables the user to receive services relating to the printer 10 from the administration server 200 and the service providing server 300. The printer application 142 may be downloaded from a particular server provided on the Internet 6 by a vendor of the printer 10 and installed on the terminal 100, or may be installed on the terminal 100 from a medium packaged with the printer 10. The browser application 144 enables the user to browse web pages.

Configuration of Administration Server 200

The administration server 200 is configured to manage data relating to the printer 10. The administration server 200 provides a mail printing service. The mail printing service provides a particular service using the mail printing function of the printer 10. The administration server 200 also provides a paid service. The paid service may provide printing on a predetermined number of pages (e.g., 200 pages) in a certain time period (e.g., per month) on a fixed-price basis. The administration server 200 is provided on the Internet 6 by the vendor of the printer 10. In another example, the administration server 200 may be provided by a server provider different from the vendor. The administration server 200 includes a communication interface 220 and a controller 230.

The communication interface 220 is connected to the Internet 6. The controller 230 includes a CPU 232 and a memory 234. The CPU 232 executes various processing in accordance with a program 136 stored in the memory 234. The memory 234 may be a volatile or nonvolatile memory. The memory 234 stores an administration table 240 in addition to the program 236.

Configuration of Service Providing Server 300

The service providing server 300 also provides the paid service. The paid service is provided by the administration server 200 and the service providing server 300. The service providing server 300 is provided on the Internet 6 by the vendor of the printer 10. In another example, the service providing server 300 may be provided by a server provider different from the vendor. The service providing server 300 includes a communication interface 320 and a controller 330.

The communication interface 320 is connected to the Internet 6. The controller 330 includes a CPU 332 and a memory 334. The CPU 332 executes various processing in accordance with a program 336 stored in the memory 334. The memory 334 may be a volatile or nonvolatile memory. The memory 334 stores a service table 340 in addition to the program 336.

Administration Table 240 and Service Table 340

Figure 2:
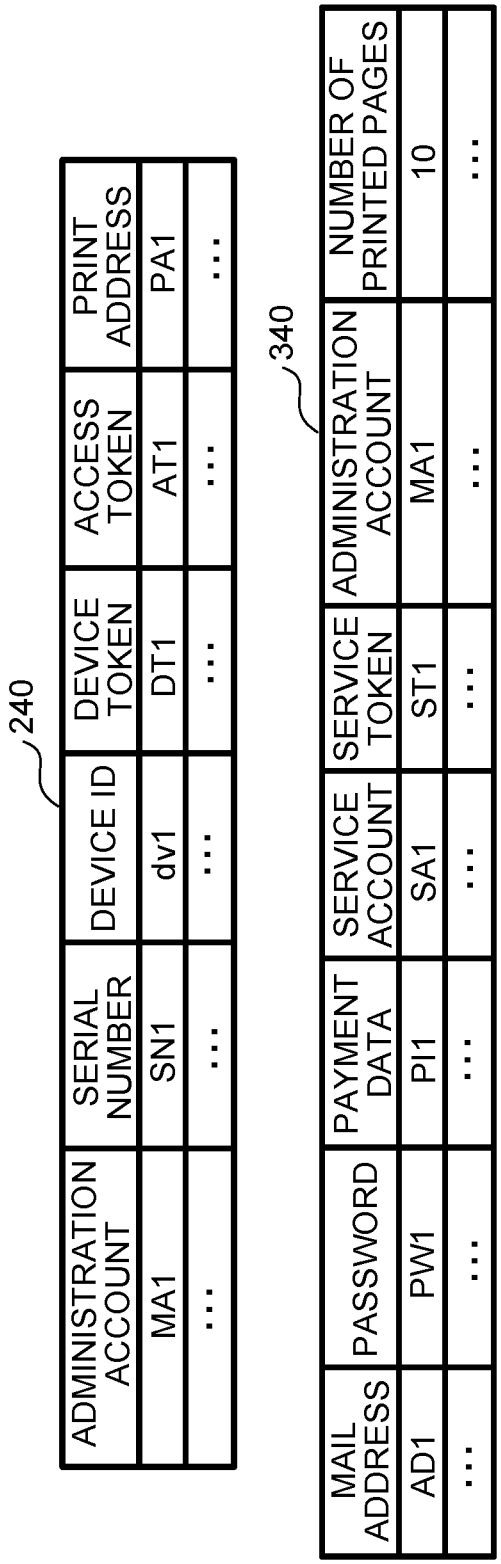
FIG. 2 shows examples of an administration table and a service table.

Referring to FIG. 2, a description will be provided on contents of the administration table 240 in the administration server 200 and contents of the service table 340 in the service providing server 300.

In the administration table 240, an administration account, a serial number, a device ID, a device token, an access token, and a print address are stored in association with each other. The administration account is used for managing data associated therewith in the administration table 240. The device ID identifies a particular printer in the administration server 200. The device token is used in authentication of a device ID associated therewith and is used for allowing replacement of the existing administration account associated therewith. The access token may be authentication data to be used for establishing an XMPP connection between the administration server 200 and a printer 10. The administration account, the device ID, the device token, and the access token are unique data generated by the administration server 200. For example, the administration server 200 is configured to generate a device ID using a serial number. The print address may be an e-mail address for identifying a printer 10 that is to perform the mail printing function.

In the service table 340, a mail address, a password, payment data, a service account, a service token, an administration account, and the number of printed pages are stored in association with each other. The payment data relates to a payment source (e.g., a credit card number) for a fee. The service account may be used for managing data associated therewith in the service table 340. The service token may be authentication data used for authenticating an administration account associated therewith. The service account and the service token are unique data generated by the service providing server 300. For example, the service providing server 300 is configured to generate a service account using an e-mail address included in user data. Hereinafter, an e-mail address, a password, and payment data may be collectively referred to as user data.

Sign-Up Process: FIGS. 3 to 6C

Figure 3:
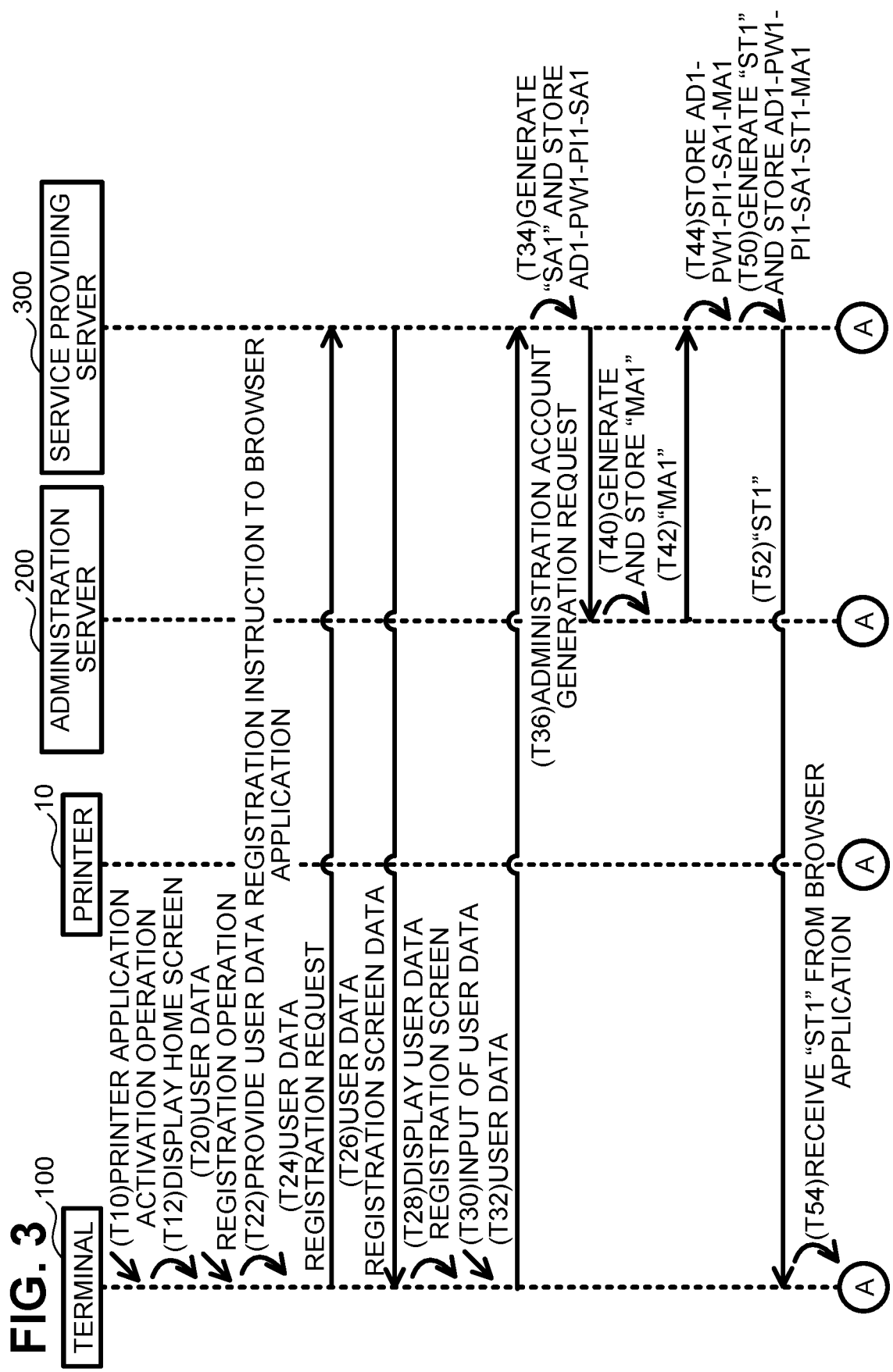
FIG. 3 is a sequence diagram of a sign-up process.
Figure 4:
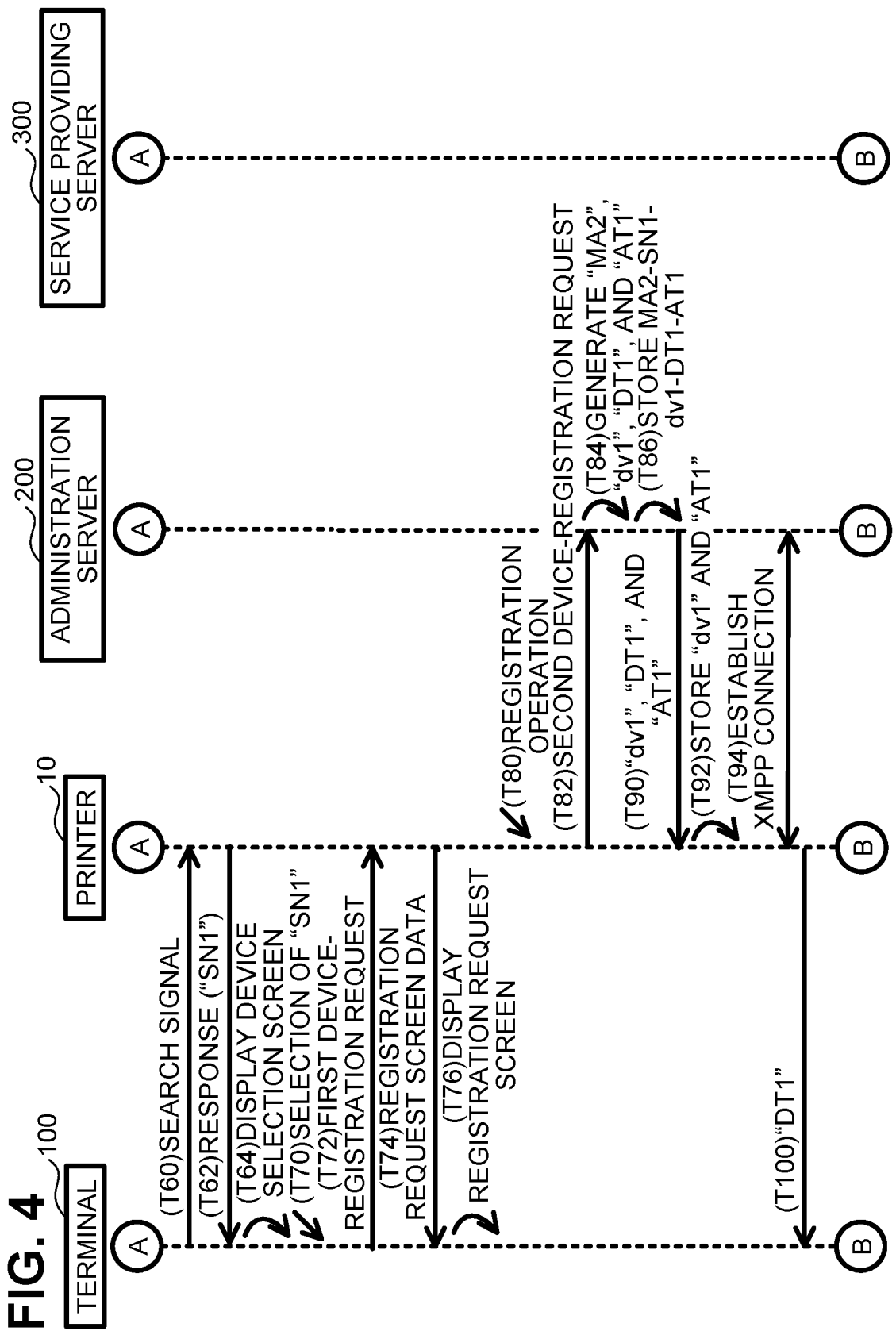
FIG. 4 is a sequence diagram continued from FIG. 3.
Figure 6A:
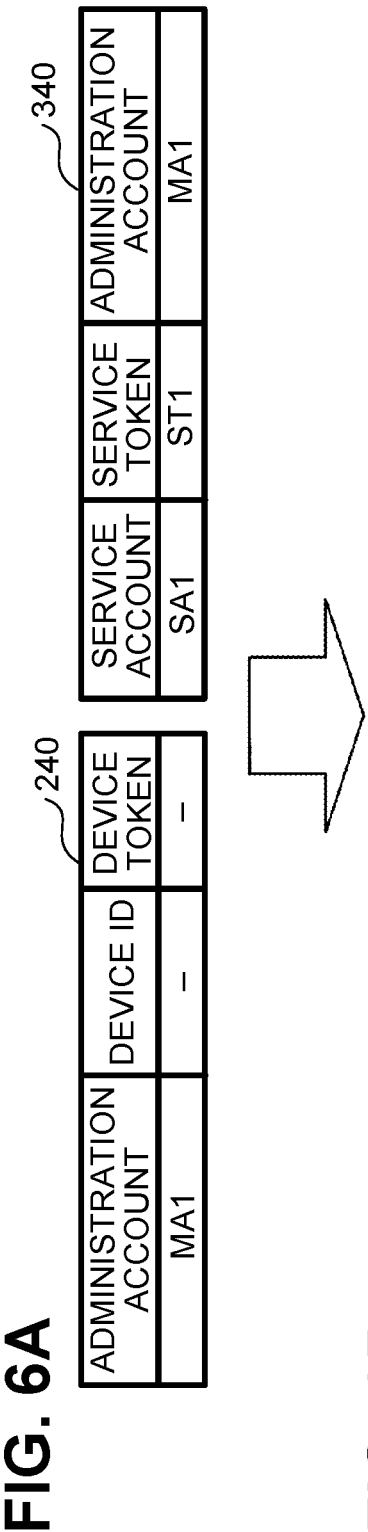
FIGS. 6A, 6B, and 6C illustrate contents change in the administration table and the service table in the sign-up process.
Figure 6B:
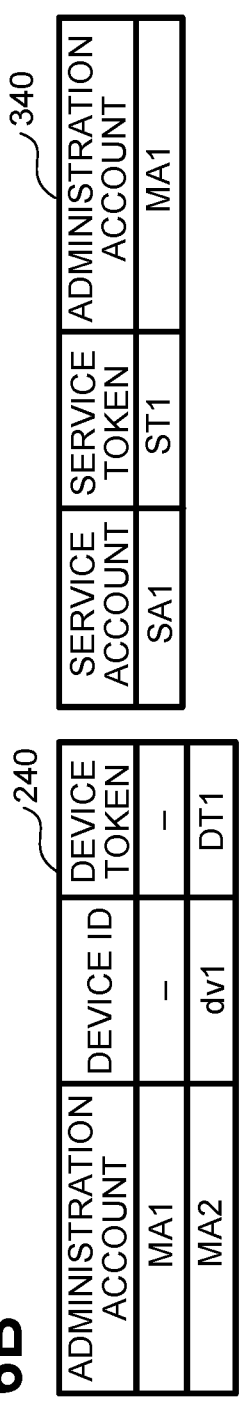
Figure 6C:
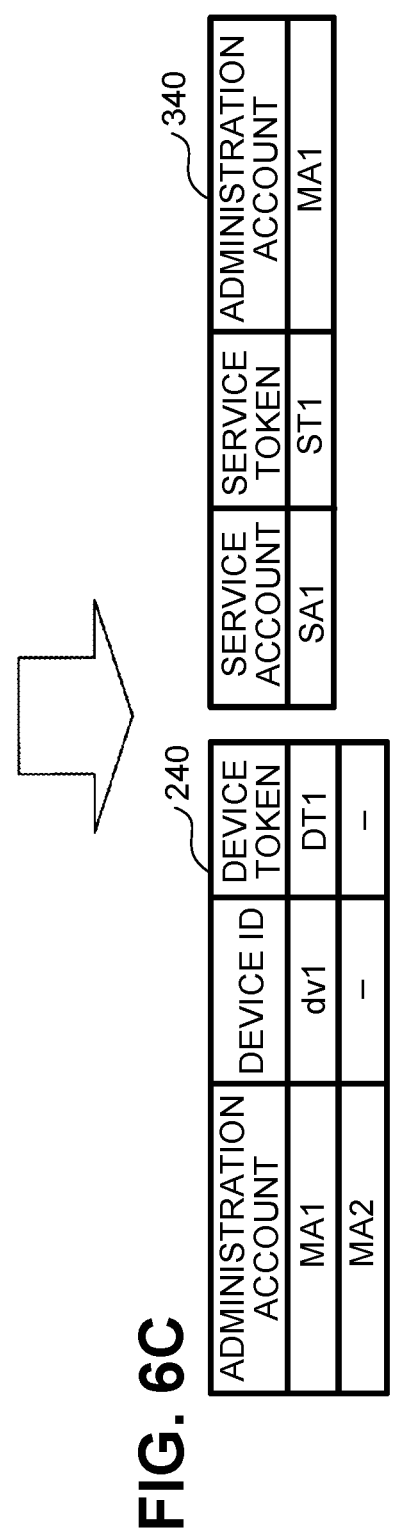

Referring to FIGS. 3 to 6C, a description will be provided on a sign-up process. The sign-up process is implemented for receiving the mail printing service and the paid service. FIGS. 6A, 6B, and 6C each show contents of data stored in the administration table 240 and the service table 340 during the sign-up process. In FIGS. 6A, 6B, and 6C, contents of the serial number, the access token, and the print address are omitted in the administration table 240 for easy understanding. In addition, contents of the mail address, the password, the payment data, and the number of printed pages are omitted in the service table 340 for the same reason. In the description below, each device (e.g., the printer 10) but not a CPU of each device (e.g., the CPU 32 of the printer 10) is regarded as a doer of actions. In addition, the printer application 142 is regarded as a doer of processing executed by the CPU 132 of the terminal 100 using the printer application 142. The browser application 144 is regarded as a doer of processing executed by the CPU 132 of the terminal 100 using the browser application 144. In FIGS. 3 to 5, communication performed by the browser application 144 is indicated by a thick line, and communication performed by the printer application 142 is represented by a thin line. Communication is performed by each device via its communication interface (e.g., the communication interface 120 of the terminal 100). Therefore, in the following description, the phrase "via the communication interface" may be omitted when processing relating to communication performed via the communication interface is described.

In step T10, the printer application 142 of the terminal 100 accepts a printer application activation operation for activating the printer application 142. In response, in step T12, the printer application 142 displays a home screen on the display 114. Subsequent to step T12, the printer application accepts a user data registration operation for registering user data and an administration account in step T20. In response, in step T22, the printer application 142 provides a user data registration instruction to the browser application 144. The user data registration instruction includes an URL of the service providing server 300. Subsequent to T22, in step T24, the browser application 144 transmits a user data registration request to the service providing server 300. The user data registration request includes, as a destination URL, the URL of the service providing server 300 received from the printer application 142. The user data registration request may be a signal requesting registration of user data with the service providing server 300 and registration of an administration account with the administration server 200. Subsequent to step T24, in step T26, the browser application 144 receives a user data registration screen from the service providing server 300. In step T28, the browser application 144 displays the user data registration screen on the display 114. Subsequent to step T28, in step T30, the browser application 144 accepts input of the user data. In response, in step T32, the browser application 144 transmits the user data to the service providing server 300. The input user data includes a mail address "AD1", a password "PW1", and payment data "PI1". As described above, the browser application 144 receives the URL of the service providing server 300 from the printer application 142. That is, the user of the terminal 100 might not necessarily input the URL of the service providing server 300 nor activate the browser application 144. Such a control may thus provide greater convenience to the user.

In step T32, the service providing server 300 receives the user data from the terminal 100. In response, in step T34, the service providing server 300 generates a service account "SA1" and stores the received user data and the generated service account "SA1" in the service table 340 in association with each other (i.e., AD1-PW1-PI1-SA1). The received user data includes the mail address "AD1", the password "PW1", and the payment data "PI1". Subsequent to step T34, in step T36, the service providing server 300 transmits an administration account generation request to the administration server 200.

In step T36, the administration server 200 receives the request administration account generation request from the service providing server 300. In response, in step T40, the administration server 200 generates and stores an administration account "MA1" in the administration table 240. In step T42, the administration server 200 transmits the generated administration account "MA1" to the service providing server 300.

In step T42, the service providing server 300 receives the administration account "MA1" from the administration server 200. In response, in step T44, the service providing server 300 stores the received administration account "MA1" in the service table 340 in association with the service account "SA1" stored therein (refer to step T34). Subsequent to step T44, in step T50, the service providing server 300 generates and stores a service token "ST1" in the service table 340 in association with the service account "ST1" stored therein. Thus, the user data (e.g., the mail address "AD1", the password "PW1", and the payment data "PI1"), the service account "SA1", the service token "ST1", and administration account "MA1" are stored in the service table 340 in association with each other. Subsequent to step T50, in step T52, the service providing server 300 transmits the generated service token "ST1" to the terminal 100.

In step T52, the browser application 144 of the terminal 100 receives the service token "ST1" from the service providing server 300. In step T54, the browser application 144 of the terminal 100 provides the received service token "ST1" to the printer application 142. That is, in step T54, the printer application 142 receives the service token "ST1" from the browser application 144. As described above, the printer application 142 may receive a service token from the service providing server 300 via the browser application 144 without activation of the browser application 144 by the user of the terminal 100. Such a control may thus provide greater convenience to the user.

After processing in step T54 has completed, the registration of the administration account with the administration server 200 and the registration of the user data with the service providing server 300 are completed. As illustrated in FIG. 6A, after processing in step T54 has completed, the administration account "MA1" is stored solely in the administration table 240. In the service table 340, the service account "SA1", the service token "ST1", and the administration account "MA1" are stored in association with each other.

In step T54, the printer application 142 of the terminal 100 receives the service token "ST1" from the browser application 144. In response, in step T60 (refer to FIG. 4), the printer application of the terminal 100 broadcasts search signals to the LAN 4. The search signals are broadcasted to one or more printers belonging to the LAN 4. A search signal may be a signal requesting a printer to return a response including a serial number assigned to the printer. In step T62, the printer application 142 receives a response including the serial number "SN1" from the printer 10. In response, in step T64, the printer application 142 displays a device selection screen on the display 114. The device selection screen includes the serial number "SN1". Subsequent to step T64, in response to accepting selection of the serial number "SN1" in step T70, the printer application 142 transmits a first device-registration request to the printer 10 in step T72. The first device-registration request may be a signal requesting the printer 10 to transmit a second device-registration request to the administration server 200. The second device-registration request may be a signal requesting registration of the printer 10 with the administration server 200. Registration of the printer 10 with the administration server 200 may enable the user to receive the mail printing service. As described above, the user may readily select the printer to be used for the mail printing service among one or more printers displayed on the device selection screen. Subsequent to step T72, in step T74, the printer application 142 receives registration request screen data from the printer 10. In response, in step T76, the printer application 143 displays a registration request screen on the display 114. The registration request screen notifies the user that the user is requested an operation for registering the printer 10 with the administration server 200. The user of the terminal 100 may thus to be notified that the registration operation needs to be performed on the printer 10 through the registration request screen.

In response to accepting the registration operation in step T80, the printer 10 transmits a second device-registration request to the administration server 200 in step T82. The second device registration request includes the serial number "SN1".

In step T82, the administration server 200 receives the second device-registration request from the printer 10. In response, in step T84, the administration server 200 generates a management account "MA2", a device ID "dv1", a device token "DT1", and an access token "AT1". In step T86, the administration server 200 stores the generated management account "MA2", device ID "dv1", device token "DT1", and access token "AT1" in the administration table 240 in association with the received serial number "SN1". Subsequent to step T86, in step T90, the administration server 200 transmits the device ID "dv1", the device token "DT1", and the access token "AT1" to the printer 10.

In response to receiving the device ID "dv1", the device token "DT1", and the access token "AT1" from the administration server 200 in step T90, the printer 10 stores the device ID "dv1" and the access token "AT1" in the memory 34 in step T92 and then establishes an XMPP connection with the administration server 200 using the access token "AT1" in step T94. Through the XMPP connection, the administration server 200 is enabled to transmit a request to the printer 10 through a firewall of the LAN 4 to which the printer 10 belongs (e.g., a firewall implemented by a router) without receiving a request from the printer 10. The way to transmit a request from the administration server 200 to the printer 10 may be implemented by another way instead of the XMPP connection. For example, a connection according to HTTPS may be established between the printer 10 and the administration server 200. Subsequent to step T94, in step T100, the printer 10 transmits the device token "DT1" to the terminal 100. In subsequent steps, the access token "AT1" is used in communication between the printer 10 and the administration server 200. Thus, a description of the access token "AT1" will be omitted when describing communication between the printer 10 and the administration server 200.

After processing in step T100 has completed, the registration of the printer 10 with the administration server 200 is completed. As illustrated in FIG. 6B, after processing in step T100 has completed, in the administration table 240, the administration account "MA2" and the device ID "dv1" are stored in association with each other and the administration account "MA1" is stored solely. In the service table 340, the service account "SA1", the service token "ST1", and the administration account "MA1" are stored in association with each other. At this moment, the administration account (e.g., "MA1") associated with the device ID "dv1" in the administration table 240 is different from the administration account (e.g., "MA2) associated with the user data in the service table 340. Thus, the device ID "dv1" stored in the administration table 240 is not associated with the user data stored in the service table 340.

In step T100, the printer application 142 of the terminal 100 receives the device token "DT1" from the printer 10. In response, in step T120 (refer to FIG. 5), the printer application 142 transmits a third device-registration request to the service providing server 300. The third device-registration request includes the received service token "ST1" (refer to step T54 in FIG. 3) and device token "DT1". The third device-registration request may be a signal requesting to store user data and a device ID in association with each other. Storing user data and a corresponding device ID in association with each other may enable the user to receive the paid service.

In step T120, the service providing server 300 receives the third device-registration request from the terminal 100. In response, the service providing server 300 performs authentication of the service token "ST1" included in the third device-registration request. In this case, the service token "ST1" included in the third device-registration request matches the service token "ST1" stored in the service table 340. Thus, in step T122, the service providing server 300 determines that the authentication has succeeded. Subsequent to step T122, the service providing server 300 identifies, in the service table 340, the administration account "MA1" associated with the authenticated service token "ST1". In step T124, the service providing server 300 transmits a replacement request to the administration server 200. The replacement request includes the device token "DT1" included in the third device-registration request and the identified management account "MA1". The replacement request may be a signal requesting to identify a device ID associated with the device token included in the replacement request and replace the existing administration account associated with the identified device ID with the administration account included in the replacement request.

In step T124, the administration server 200 receives the replacement request from the service providing server 300. In response, the administration server 200 performs authentication of the device token "DT1" included in the replacement request. In this case, the device token "DT1" included in the replacement request matches the device token "DT1" stored in the administration table 240. Thus, in step T126, the service providing server 300 determines that the authentication has succeeded. Subsequent to step T126, in step T128, the administration server 200 identifies, in the administration table 240, the administration account "MA2" associated with the authenticated device token "DT1", and replaces the existing administration account "MA2" identified in the administration table 240 with the administration account "MA1" included in the replacement request. Subsequent to step T128, in step T130, the administration server 200 transmits a first completion notification to the service providing server 300. The first completion notification indicates that the administration account associated with the device ID "dv1" in the administration table 240 has been replaced.

In step T130, the service providing server 300 receives the first completion notification from the administration server 200. In response, the service providing server 300 transmits a second completion notification to the terminal 100. The second completion notification indicates completion of the registration of the user data with the service providing server 300, completion of the registration of the printer 10 with the administration server 200, and completion of the storage of the user data and the device ID in association with each other.

In step T132, the printer application 142 of the terminal 100 receives the second completion notification from the service providing server 300. In response, in step T134, the printer application 142 displays a completion screen on the display 114. The user of the terminal 100 may thus to be notified of the completion of the registration of the user data with the service providing server 300, the completion of the registration of the printer 10 with the administration server 200, and the completion of the storage of the user data and the device ID in association with each other. Subsequent to step T134, in response to accepting a paid-service sign-up operation in T140, the printer application 142 transmits a first paid-service start request to the service providing server 300 in step T142. The first paid-service start request includes a service name "BS1" and the service token "ST1". The service name "BS1" indicates the name of the paid service.

Step T144 is the same as step T122 (refer to FIG. 5). Subsequent to step T144, in step T146, the service providing server 300 transmits a second paid-service start request to the administration server 200. The second paid-service start request includes the service name "BS1" and the administration account "MA1".

In step T146, the administration server 200 receives the second paid-service start request from the service providing server 300. The administration server 200 identifies the service name "BS1" included in the second paid-service start request and determines to start providing the paid service. Then, the administration server 200 identifies, in the administration table 240, the device ID "dv1" associated with the administration account "MA1" in the second paid-service start request. In step T148, the administration server 200 transmits a notification data request to the printer 10 identified by the identified device ID "dv1". The notification data request may be a signal requesting to transmit notification data (e.g., the device ID "dv1" and the number of printed pages) necessary for providing the paid service. In response to receiving the notification data request from the administration server 200, the printer 10 transmits first notification data to the administration server 200 every time a certain time period (e.g., 24 hours) elapses. The notification data includes the device ID "dv1" and the number of printed pages.

After processing in step T148 has been completed, the sign-up process is completed. As illustrated in FIG. 6C, after processing in step T148 has completed, in the administration table 240, the administration account "MA1" and the device ID "dv1" are stored in association with each other and the administration account "MA2" is stored solely. In the service table 340, the service account "SA1", the service token "ST1", and the administration account "MA1" are stored in association with each other. At this moment, the administration account (e.g., "MA1") associated with the device ID "dv1" in the administration table 240 matches the administration account (e.g., "MA1) associated with the user data in the service table 340.

Mail Printing Service; FIG. 7

Referring to FIG. 7, a description will be provided on the mail printing service provided by the administration server 200. An initial state when the mail printing service starts may be the state after the sign-up process (refer to FIGS. 3 to 5) is completed. That is, in the administration table 240, the administration account "MA1", the serial number "SN1", the device ID "dv1", the device token "DT1", and the access token "AT1" are stored in association with each other. In the service table 340, the mail address "AD1", the password "PW1", the payment data "PI1", the service account "SA1", the service token "ST1", the administration account "MA1", and the number of printed pages "0" are stored in association with each other. After the sign-up process is completed, the administration server 200 generates a print address "PA1" and stores the print address "PA1" in the administration table 240 in association with the administration account "MA1". Then, the administration server 200 transmits, to the printer 10, print data including the print address "PA1" as a text string. In this case, the printer 10 prints an image corresponding to the print data. This allows the user to be notified the print address "PA1".

In response to accepting an e-mail transmission operation in step T210, the terminal 100 transmits an e-mail "EM1" in step T212. The e-mail transmission operation instructs the terminal 100 to transmit the e-mail "EM1" including the print address "PA1" as a destination address and to which an image file F1 is attached.

In response to receiving the e-mail "EM1" in step T212, the administration server 200 identifies the print address "PA1" that is the destination address of the e-mail "EM1". Subsequent to step T212, the administration server 200 identifies, in the administration table 240, the device ID "dv1" associated with the identified print address "PA1". The administration server 200 further identifies the printer 10 identified by the device ID "dv1" as a target printer. Next, in step T220, the administration server 200 converts the image file "F1" attached to the e-mail "EM1" to generate print data "PD1". Subsequent to step T220, the administration server 200 transmits a print request to the printer 10 in step T222. Subsequent to step T222, the administration server 200 receives a print data request from the printer 10 in step T224. Subsequent to step T224, the administration server 200 transmits the print data "PD1" to the printer 10 in step T226.

In response to receiving the print data "PD1" from the administration server 200 in step T226, the printer 10 prints an image corresponding to the print data "PD1" in step T230. That is, the printer 10 executes the mail printing function. Subsequent to step T230, the printer 10 transmits, to the administration server 200, a printing completion notification that printing has completed, in step T232.

In response to receiving the printing completion notification from the printer 10 in step T232, the administration server 200 creates an e-mail "EM2". In step T240, the administration server 200 transmits the e-mail "EM2" to the terminal 100. The e-mail "EM2" includes an e-mail address assigned to a user of the terminal 100 as a destination address, and a message that printing has been completed in a mail body. The user of the terminal 100 may be enabled to be notified, when the user opens the e-mail "EM2", that the mail printing function has been executed. As described above, in the mail printing service, the administration account and the user data are not used. More specifically, the main printing service may be provided even when the administration account associated with the device ID "dv1" in the administration table 240 does not match the administration account associated with the user data in the service table 340. That is, the mail printing service may be provided after processing in step T100 of the sign-up process is executed. More specifically, the mail printing service may be provided if only the administration account "MA2" and the device ID are stored in association with each other in the administration server 200 and the printer 10 has received and stores the device ID. Further, the mail printing service may be provided even in a state where user data is not stored in the service table 340. In other words, the mail printing service may be provided after the processing in step T20 to T54 of the sign-up process are executed without executing the processing in steps T72 to T100 of the sign-up process. More specifically, even if the service account "SA1" and the administration account "MA1" are not stored in association with each other in the service providing server 300, the mail printing service may be provided as long as the administration account "MA2" and the device ID are stored in association with each other in the administration server 200 and the printer 10 has been received the device ID and stores the device ID therein.

Paid Service; FIG. 8

Referring to FIG. 8, a description will be provided on the paid service. An initial state when the paid service starts may be the same as the initial state when the mail printing service starts, that is, the state after the sign-up process (refer to FIGS. 3 to 5) is completed.

In step T310, the administration server 200 receives first notification data from the printer 10. The first notification data includes the device ID "dv1" and the number of printed pages "150". The administration server 200 identifies, in the administration table 240, the administration account "MA1" associated with the device ID "dv1" included in the first notification data. In step T312, the administration server 200 transmits second notification data to the service providing server 300. The second notification data includes the received number of printed pages "150" and the identified administration account "MA1".

In step T312, the service providing server 300 receives the second notification data from the administration server 200. In response, the service providing server 300 identifies, in the service table 340, the administration account "MA1" included in the second notification data. In step T314, the service providing server 300 updates the value of the number of printed pages associated with the identified management account "MA1" from "0" to "150" in the service table 340.

In response to determining that a certain time period (e.g., one month) has elapsed from the start of the paid service, the service providing server 300 determines the number of printed pages in step T320. In this case, the service providing server 300 determines that the number of printed pages (e.g., "150") associated with the administration account "MA1" in the service table 340 is less than a threshold (e.g., "200") and thus determines that a fixed fee is to be charged to the user. Subsequent to step T320, the service providing server 300 identifies, in the service table 340, the payment data "PI1" associated with the administration account "MA1". In step T322, the service providing server 300 executes a billing process using the payment data "PI1". Subsequent to step T322, the service providing server 300 identifies the e-mail address "AD1" associated with the administration account "MA1" stored in the service table 340. In step T324, the service providing server 300 transmits an e-mail "EM3" to the terminal 100. The e-mail "EM3" includes the e-mail address "AD1" as a destination address, and a message that payment for service is demanded in a mail body. The user of the terminal 100 may be enabled to be notified, when the user opens the e-mail "EM3", that the billing process has been executed. As described above, in the paid service, the administration account and the user data are used. More specifically, the paid service may be provided in a state where the administration account associated with the device ID "dv1" in the administration table 240 stored in the administration server 200 matches the administration account associated with the user data in the service table 340 stored in the service providing server 300 (e.g., both the administration accounts indicate "MA1"). That is, the paid service might not be provided even if at least one of states is established where the service account "SA1" and the administration account "MA1" are stored in association with each other in the service providing server 300 (refer to FIG. 3) and where the administration account "MA2" and the device ID are stored in association with each other in the administration server 200 and the printer 10 has been received the device ID and stores the device ID therein (refer to FIG. 4). The paid service may be provided only after the sign-up process is completed.

Effects

In the communication system 2, the administration account "MA1" and the service token "ST1" are stored in the service table 340 in association with each other in the service providing server 300 (e.g., step T50 in FIG. 3), and the device ID "dv1" and the device token "DT1" are stored in the administration table 240 in association with each other in the administration server 200 (e.g., step T86 in FIG. 4). The terminal 100 receives the service token "ST1" and the device token "DT1" (e.g., step T52 in FIG. 3, and step T100 in FIG. 4), and transmits the third device-registration request including the service token "ST1" and the device token "DT1" to the server (e.g., step T120 in FIG. 5). Thus, in the administration server 200, the administration account "MA1" associated with the service token "ST1" and the device ID "dv1" associated with the device token "DT1" are stored in the administration table 240 in association with each other. Such a control may thus enable the administration account "MA1" and the device ID "dv1" to be stored in the administration server 200 in association with each other.

The terminal 100 transmits a user data registration request to the service providing server 300 (e.g., step T24 in FIG. 3). In this case, the service providing server 300 stores the administration account "MA1" and the service token "ST1" in the service table 340 in association with each other (e.g., step T50), and transmits the service token "ST1" to the terminal 100 (e.g., step T52). The terminal 100 receives the service token "ST1" from the service providing server 300 (e.g., step T54). The terminal 100 transmits a first device-registration request to the printer 10 (e.g., step T72 in FIG. 4). In this case, the printer 10 transmits a second device-registration request to the administration server 200 (e.g., step T82). In response, the administration server 200 stores the device ID "dv1" and the device token "DT1" in association with each other in the administration table 240 (e.g., step T86), and transmits the device token "DT1" to the printer 10 (e.g., step T90). Then, the terminal 100 receives the device token "DT1" from the printer 10 (e.g., step T100). The terminal 100 transmits, to the service providing server 300, a third device-registration request including the service token "ST1" and the device token "DT1" (e.g., step T120 in FIG. 5). Thus, in the administration server 200, the administration account "MA1" associated with the service token "ST1" and the device ID "dv1" associated with the device token "DT1" are stored in the administration table 240 in association with each other (e.g., step T128). Such a control may thus enable the administration account "MA1" and the device ID "dv1" to be stored in the administration server 200 in association with each other.

In response to receiving a user data registration request from the terminal 100 (e.g., step T22 in FIG. 3), the service providing server 300 stores the administration account "MA1" and the service token "ST1" in the service table 340 in association with each other (e.g., step T50). In response to receiving a second device-registration request from the printer 10 (e.g., step T82 in FIG. 4), the administration server 200 stores the device ID "dv1" and the device token "DT1" in the administration table 240 in association with each other (e.g., step T86). In response to the service providing server 300 receiving a third device-registration request including the service token "ST1" and the device token "DT1" from the terminal 100 (e.g., step T120 in FIG. 5), the administration server 200 stores the administration account "MA1" associated with the service token "ST1" and the device ID "dv1" associated with the device token "DT1" in association with each other in the administration table 240 (e.g., step T128). Such a control may thus enable the administration account "MA1" and the device ID "dv1" to be stored in the administration server 200 in association with each other.

In response to the service providing server 300 receiving a third device-registration request from the terminal 100 (e.g., step T120 in FIG. 5), the administration server 200 replaces, in the administration table 240, the existing administration account "MA2" associated with the device token "DT1" included in the third device-registration request with the administration account "MA1" associated with the service token "ST1", thereby storing the administration account "MA1" and the device ID "dv1" in the administration table 240 in association with each other. Such a control may thus reduce or prevent a single device ID from being stored in association with multiple administration accounts.

The communication system 2 includes two servers such as the administration server 200 and the service providing server 300. Such a configuration may thus lighten the processing load on the administration server 200 and the service providing server 300 as compared with a case where the communication system 2 includes a single server. In a case where the communication system 2 includes a single server, if the server goes down, the user might not receive any of the mail printing service and the paid service. In the illustrative embodiment, the communication system 2 includes the administration server 200 and the service providing server 300. Thus, even if the service providing server 300 goes down, the user may receive the mail printing service as long as the administration server 200 is in operation. Such a configuration may thus provide greater convenience to the user.

Correspondences

The printer 10 is an example of a communication device. Each of the administration server 200 and the service providing server 300 is an example of a server. The administration account is an example of account data. The user data registration request transmitted in step T24 is an example of a first registration request. The administration account "MA1" is an example of first account data. The service token "ST1" is an example of first authentication data. Each of the memory 234 of the administration server 200 and the memory 334 of the service providing server 300 is an example of memory of the server. The first device-registration request transmitted in step T72 is an example of a second registration request. The second device-registration request transmitted in step T82 is an example of a third registration request. The device ID "dv1" is an example of device identification data. The device token "DT1" is an example of second authentication data. The third device-registration request transmitted in step T120 is an example of a fourth registration request.

The URL of the service providing server 300 is an example of location data of the server. The device selection screen displayed in step T64 is an example of a selection screen.

The administration account "MA2" is an example of second account data. The mail printing service is an example of a first service. The paid service is an example of a second service. The administration server 200 is an example of a first server. The service providing server 300 is an example of a second server. The memory 234 of the administration server 200 is an example of a first memory. The memory 334 of the service providing server 300 is an example of a second memory. The administration account generation request transmitted in step T36 is an example of an account request. The replacement request transmitted in step T124 is an example of a fifth registration request.

While the disclosure has been described in detail with reference to the specific embodiment thereof, this is merely an example, and various changes, arrangements and modifications may be applied therein without departing from the spirit and scope of the disclosure. Modifications of the illustrative embodiment are described below.

In the illustrative embodiment, the administration server 200 generates a device ID. Nevertheless, in modifications, the printer 10 may generate a device ID. In this case, in step T82 (refer to FIG. 4), the printer 10 transmits, to the administration server 200, a second device-registration request including a device ID. The device ID generated by the printer 10 is another example of the device identification data. In other modifications, both the printer 10 and the administration server 200 may generate a device ID. In this case, in step T82, the printer 10 transmits, to the administration server 200, a second device-registration request including a device ID generated by the printer 10. In step T84, the administration server 200 generates a device ID that is different from the device ID received from the printer 10.

In other modifications, in response to accepting input of the URL of the service providing server 300 and an operation for transmitting a user data registration request performed by the user, the browser application 144 may transmit a user data registration request to the service providing server 300. In this case, in response to receiving the service token "ST1" from the service providing server 300 in step T52, the browser application 144 may execute the same step as step T54 (refer to FIG. 3) or may store the service token "ST1" in a certain area of the memory 134. The printer application 142 thus obtains the service token "ST1" from the certain area of the memory 134.

In other modifications, steps T60 to T70 may be omitted. In one example, the printer application 142 of the terminal 100 may transmit a first device-registration request to the printer registered with the memory 134 in advance. In this case, step T64 may be omitted.

In other modifications, the sequence of steps in the sign-up process may be changed. For example, in response to receiving a printer application activation operation, the printer application 142 of the terminal 100 executes steps T60 to T100 (refer to FIG. 4). Subsequent to step T100, in response to receiving the device token "DT1" from the printer 10, the printer application 142 executes steps T12 to T54 (refer to FIG. 3). Subsequent to step T54, the printer application 142 executes steps T120 to T136 (refer to FIG. 5). In other modifications, in response to accepting a printer application activation operation and a registration operation for registering the printer 10 with the administration server 200, the printer application 142 may execute steps T60 to T100 (refer to FIG. 4).

In other modifications, in step T128 (refer to FIG. 5), the administration server 200 may store the administration account "MA1" in the administration table 240 in association with the device ID "dv1" while retaining data in which the administration account "MA2" is associated with the device ID "dv1" in the administration table 240. In this case, two administration accounts "MA1" and "MA2" are stored in the administration table 240 in association with the device ID "dv1".

In other modifications, the first service may be a remote printing service. In the remote printing service, the printer application 142 of the terminal 100 transmits an image file and the device token "DT1" to a third server different from the administration server 200 and the service providing server 300. The third server includes a memory, and the device token "DT1" and the administration account "MA1" are stored in the memory of the third server in association with each other. In response to receiving the image file and the device token "DT1" from the terminal 100, the third server identifies the administration account "MA1" associated with the received device token "DT1", and transmits the image file and the administration account "MA1" to the administration server 200. In response to receiving the image file and the administration account "MA1" from the third server, the administration server 200 identifies the printer 10 corresponding to the administration account "MA1" as a target printer. Then, the administration server 200 converts the received image file into a print file and transmits a print instruction including the print file to the printer 10. In response to receiving the print instruction from the administration server 200, the printer 10 stores the print data in the memory 34. Thereafter, in response to accepting an operation for instructing printing of the print data stored in the memory 34, the printer 10 prints an image corresponding to the print data. The second service may be an order service that enables automatic ordering and delivery of a spare consumable item when the remaining life of a particular consumable item used in the printer 10 has reached below a threshold. In this case, user data including address data is stored in the service table 340 of the service providing server 300.

In the illustrative embodiment, the administration server 200 provides the mail printing service. Nevertheless, in other modifications, the administration server 200 and a fourth server may provide the main printing service. The fourth server is different from the administration server 200 and the service providing server 300. In this case, the print address "PA1" is not stored in the administration table 240 of the administration server 200. The fourth server includes a memory, and the administration account "MA1" and the print address "PA1" are stored in the memory of the fourth server in association with each other. In response to receiving an e-mail "EM1" from the terminal 100 in step T212 (refer to FIG. 7), the fourth server identifies the administration account "MA1" associated with the print address "PA1" in the memory of the fourth server and transmits a print instruction including the identified administration account "MA1" and an image file "F1" to the administration server 200. The subsequent steps are the same as steps T220 to T232. In other modifications, the fourth server may convert the image file "F1" to generate print data "PD1".

In other modifications, a single server may configure the communication system 2. In this case, steps T36, T42, and T50 may be omitted. In other modifications, the communication system 2 may include three or more servers.

In other modifications, the steps in FIGS. 2 to 5, 7, and 8 are executed by software (e.g., the programs 36, 140, 142, 144, 236, 336) but at least one of the steps may be executed by hardware such as a logic circuit.

The technical elements described in this specification or the drawings exhibit technical usefulness alone or in various combinations, and are not limited to the combinations described in the claims at the time of filing. The techniques illustrated in the present specification or the drawings achieve multiple objects simultaneously, and has technical utility by achieving one of the objects.

What is claimed is:

1. A communication system comprising:
a terminal including a processor and memory;
a communication device including a processor and memory; and
a server including a processor and memory, wherein:
the processor of the terminal device is configured to transmit a first registration request to the server, the first registration request requesting registration of account data,
the processor of the server is configured to:
in response to receiving the first registration request, store first account data and first authentication data in the memory of the server in association with each other; and
transmit the first authentication data to the terminal,
the processor of the terminal is configured to:
receive the first authentication data transmitted from the server; and
transmit a second registration request to the communication device, the second registration request requesting registration of the communication device with the server,
the processor of the communication device is further configured to, in response to receiving the second registration request from the terminal, transmit a third registration request to the server, the third registration request requesting registration of the communication device with the server,
the processor of the server is further configured to:
in response to receiving the third registration request from the communication device, store device identification data and second authentication data in the memory of the server in association with each other, the device identification data identifying the communication device; and
transmit the second authentication data to the communication device,
the processor of the communication device is further configured to, in response to receiving the second authentication data from the server, transmit the second authentication data to the terminal,
the processor of the terminal is further configured to, in response to receiving the first authentication data from the server and the second authentication data from the communication device, transmit a fourth registration request to the server, the fourth registration server including the first authentication data and the second authentication data, and
the processor of the server is further configured to, in response to receiving the fourth registration data from the terminal, store the first account data and the device identification data in the memory of the server in association with each other, the first account data being associated with the first authentication data included in the fourth registration request, the device identification data being associated with the second authentication data included in the fourth registration request.

2. A non-transitory computer-readable medium storing computer-readable instructions that, when executed by a processor of a terminal, cause the processor to perform:
transmitting a first registration request to a server, the first registration request requesting registration of account data;
receiving first authentication data transmitted from the server, the first authentication data having been stored in the server in association with first account in response to receiving the first registration request from the server;

transmitting a second registration request, the second registration request requesting registration of a communication device with the server;

receiving second authentication data transmitted from the communication device, the second authentication data having been stored in the server in association with device-identification data identifying the communication device in response to the server receiving a third registration request transmitted from the communication device in response to the communication device receiving the second registration request from the terminal; and in response to receiving the first authentication data and from the server and the second authentication data from the communication device, transmitting a fourth registration request including the first authentication data and the second authentication data.

3. The non-transitory computer-readable medium according to claim 2, wherein the transmitting the first registration request to the server includes transmitting location data of the server to the terminal.

4. The non-transitory computer-readable medium according to claim 3, wherein the computer-readable instructions cause the processor to perform providing the first authentication data having been received from the server in the receiving the first authentication data transmitted from the server.

5. The non-transitory computer-readable medium according to claim 2, wherein:

the computer-readable instructions further cause the processor to perform broadcasting a signal to one or more devices belonging to the same network to which the terminal belongs and displaying, on a display of the terminal, a screen for accepting selection of one of the one or more devices found by the broadcasting, and the computer-readable instructions cause the processor to perform the transmitting the second registration request to the communication device in response to selecting the one of the one or more devices on the screen.

6. The non-transitory computer-readable medium according to claim 2, wherein the computer-readable instructions cause the processor to perform the transmitting the second registration request to the communication device subsequent to the transmission of the first registration request to the server.

7. A server system comprising:
a first server including:
a first processor; and
a first memory storing computer-readable instructions that, when executed by the first processor, cause the first processor to perform:
first reception including receiving a first registration request from a terminal, the first registration request requesting registration of account data;
first storing in response to receiving the first registration request from the terminal, the first storing including storing first account and first authentication data in the first memory in association with each other;
first transmission including transmitting the first authentication data to the terminal;
second reception in response to the terminal transmitting a second registration request to a communication device, the second reception including receiving a third registration request from the communication device, the second registration request requesting registration of the communication device with the first server, the third registration request requesting registration of the communication device with the first server;
second storing in response to receiving the third registration request from the communication device, the second storing including storing device identification data and second authentication data in the first memory in association with each other;
second transmission including transmitting the second authentication data to the communication device;
third reception including receiving a fourth registration request from the terminal, the fourth registration request including the first authentication data and the second authentication data, the second authentication data having been transmitted to the terminal from the communication device in response to the communication device receiving the second authentication data from the first server; and
third storing in response to receiving the fourth registration request from the terminal, the third storing including storing the first account and the device identification data in the first memory in association with each other, the first account associated with the first authentication data included in the fourth registration request, the device identification data associated with the second authentication data included in the fourth registration request.

8. The server system according to claim 7, wherein:
the second storing includes, in response to receiving the third registration request from the communication device, storing second account data, the device identification data, and the second authentication data in the first memory in association with each other, the second account data being different from the first account data, and
the third storing includes, in response to receiving the fourth registration request from the terminal, replacing the second account data with the first account data in the first memory, thereby storing the first account data and the device identification data in the first memory in association with each other, the second account data being associated with the second authentication data included in the fourth registration request, the first account data being associated with the first authentication data included in the fourth registration request.

9. The server system according to claim 7, wherein:
the first server is configured to provide a first service and a second service different from the first service,
the first service is enabled by storing of the device identification data in the first memory in response to receiving the third registration request from the first server, and does not use user data input by a user of the communication device,
the second service is enabled by storing the first account data and the device identification data in the first memory in response to receiving the fourth registration request from the first server, and uses the user data.

10. The server system according to claim 7, wherein the second reception includes, subsequent to transmission of the first authentication data to the terminal, receiving the third registration request from the communication device.

11. The server system according to claim 7, further comprising a second server different from the first server, the second server including:

a second processor; and a second memory storing computer-readable instructions that, when executed by the second processor, cause the second processor to perform the first reception, the first storing, the first transmission, and the third reception, wherein:

the first storing includes storing the first account data and the first authentication data in the first memory in association with each other, the computer-readable instructions further cause the first processor of the first server to perform the second reception, the second storing, the second transmission, and the third storing, the second storing includes storing the device identification data and the second authentication data in the second memory in association with each other, and the third storing includes the first account data and the device identification data in association with each other in the second memory.

12. The server system according to claim 11, wherein:

the computer-readable instructions further cause the second processor of the second server to further perform third transmission in response to receiving the first registration request from the terminal, the third transmission including transmitting an account request requesting to transmit account data, the computer-readable instructions further cause the first processor of the first server to further perform fourth transmission in response to receiving the account request from the second server, the fourth transmission including transmitting the first account data to the second server, and the first storing includes storing the first account data and the first authentication data in the second memory in association with each other in response to receiving the first account data from the first server.

13. The server system according to claim 11, wherein:

the computer-readable instructions further cause the second processor of the second server to further perform fifth transmission in response to receiving the fourth registration request from the terminal, the fifth transmission including transmitting a fifth registration request to the first server, the fifth registration request including the first account data and the second authentication data, the first account data being associated with the first authentication data included in the fourth registration request, the second authentication data being included in the fourth registration request, and the third storing includes, in response to receiving the fifth registration request from the second server, storing the first account data and the device identification data in the first memory in association with each other, the first account data being included in the fifth registration request, the device identification data being associated with the second authentication data included in the fifth registration data.

14. A non-transitory computer-readable medium storing computer-readable instructions that, when executed by a processor of a server, cause the processor to perform:

receiving a first registration request from a terminal, the first registration request requesting registration of account data;

in response to receiving the first registration request from the terminal, storing first account and first authentication data in the memory in association with each other;

transmitting the first authentication data to the terminal;

in response to the terminal transmitting a second registration request to a communication device, receiving a third registration request from the communication device, the second registration request requesting registration of the communication device with the server, the third registration request requesting registration of the communication device with the server;

in response to receiving the third registration request from the communication device, storing device identification data and second authentication data in the memory in association with each other;

transmitting the second authentication data to the communication device;

receiving a fourth registration request from the terminal, the fourth registration request including the first authentication data and the second authentication data, the second authentication data having been transmitted to the terminal from the communication device in response to the communication device receiving the second authentication data from the server; and in response to receiving the fourth registration request from the terminal, storing the first account and the device identification data in the memory in association with each other, the first account associated with the first authentication data included in the fourth registration request, the device identification data associated with the second authentication data included in the fourth registration request.

* * * * *

UNITED STATES PATENT AND TRADEMARK OFFICE
CERTIFICATE OF CORRECTION

| | |
|---|---|
| PATENT NO. | : 11,611,682 B2 |
| APPLICATION NO. | : 17/679313 |
| DATED | : March 21, 2023 |
| INVENTOR(S) | : Yuki Kitahashi et al. |

It is certified that error appears in the above-identified patent and that said Letters Patent is hereby corrected as shown below:

On the Title Page

(57) Abstract, Line 1 should read:
A processor of a sever is configured to receive a first
(57) Abstract, Line 2 should read:
registration request from a terminal, store first account data and
(57) Abstract, Lines 4-6 should read:
association with each other, transmit the first authentication data to terminal, receive a third
registration request from a communication device, store device identification
(57) Abstract, Lines 8-9 should read:
association with each other, transmit the second authentication data to the communication device, receive a fourth
(57) Abstract, Line 11 should read:
and the second authentication data, and store the first In the Claims Column 19, Claim 2, Line 13 should read:
in response to receiving the first authentication data
Column 19, Claim 7, Line 57 should read:
including storing first account data and first authenti-
Column 20, Claim 7, Line 23 should read:
storing including storing the first account data and the
Column 20, Claim 7, Line 25 should read:
association with each other, the first account data asso- Signed and Sealed this
Tenth Day of October, 2023

Katherine Kelly Vidal
*Director of the United States Patent and Trademark Office*